Feb. 15, 1944.     F. C. MEYER     2,342,003
PRESSURE OPERATED VALVE GEAR
Filed Nov. 12, 1941     2 Sheets-Sheet 1

INVENTOR
Fred C. Meyer.
BY
ATTORNEY

Feb. 15, 1944.　　　F. C. MEYER　　　2,342,003
PRESSURE OPERATED VALVE GEAR
Filed Nov. 12, 1941　　　2 Sheets-Sheet 2
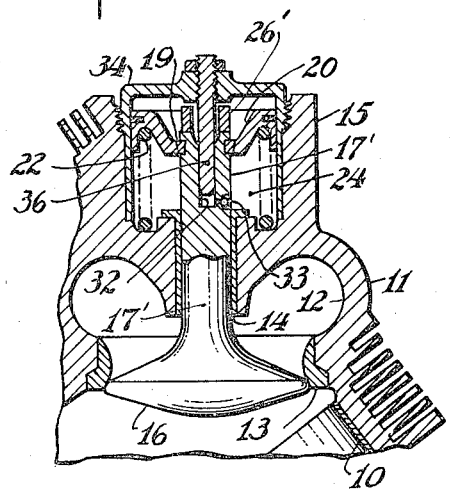
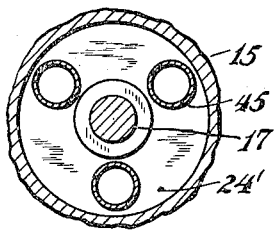
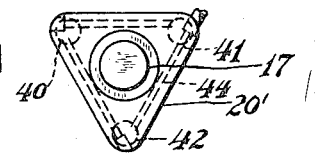
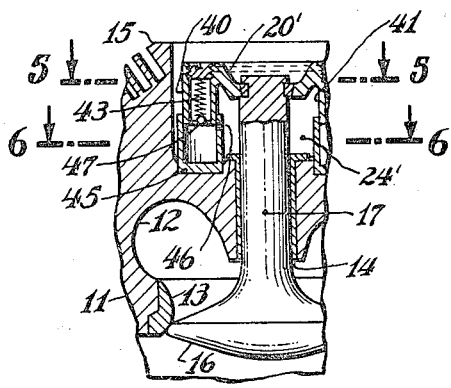
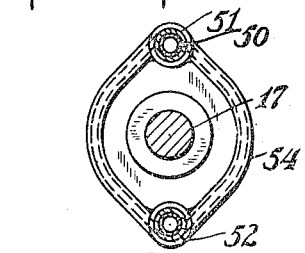
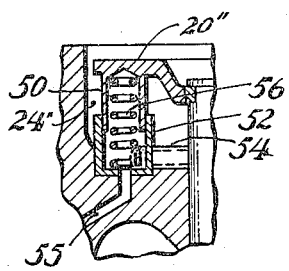
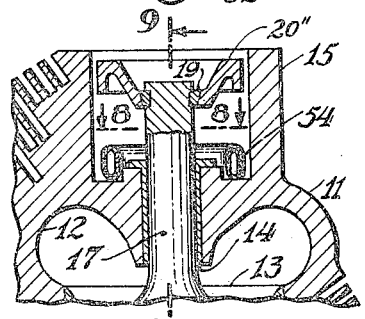
INVENTOR
Fred C. Meyer.
ATTORNEY Patented Feb. 15, 1944

2,342,003

UNITED STATES PATENT OFFICE 2,342,003

PRESSURE OPERATED VALVE GEAR

Fred C. Meyer, Wyckoff, N. J., assignor to Wright Aeronautical Corporation, a corporation of New York Application November 12, 1941, Serial No. 418,636

10 Claims. (Cl. 123—92)

This invention relates to valve operating mechanisms for engines and is particularly concerned with novel means for closing engine poppet valves.

In a conventional poppet valve system, the valve stem is embraced by a spring which is so connected as to exert closing force on the valve, valve opening being accomplished by a push rod or rocker arm driven from an engine camshaft. Valve springs are satisfactory when engine speeds are moderate but the springs required for large valves in high power aircraft engines operating at high speed become quite bulky and heavy in order to provide sufficient closing force to overcome the inertia of the valve.

It is an object of this invention to provide fluid closing means for poppet valves, preferably in the form of a gas. A further object of the invention is to utilize pneumatic pressure for affording valve closure. Still another object is to provide valve closing means actuated by the gases contained within an engine cylinder. Still another object is to provide pressure control means in a pneumatic valve closing system by which the pressure exerted for valve closing is roughly proportional to engine speed. Still another object is to provide a pneumatic booster to augment valve closing force produced initially by a valve spring. Still another object is to provide a valve closing system in an engine which is compact and small as compared with the valve closing systems of the prior art, and a further object is to provide a valve closing system which will permit of a shortening of the overall cylinder height in the case of overhead valve engines.

Further objects of the invention may be appreciated in reading the annexed detailed description, in which:

Fig. 3 is a fragmentary section showing a third embodiment;

Fig. 4 is a fragmentary section showing a fourth embodiment;

Figure 11:
Figures 2, 10:
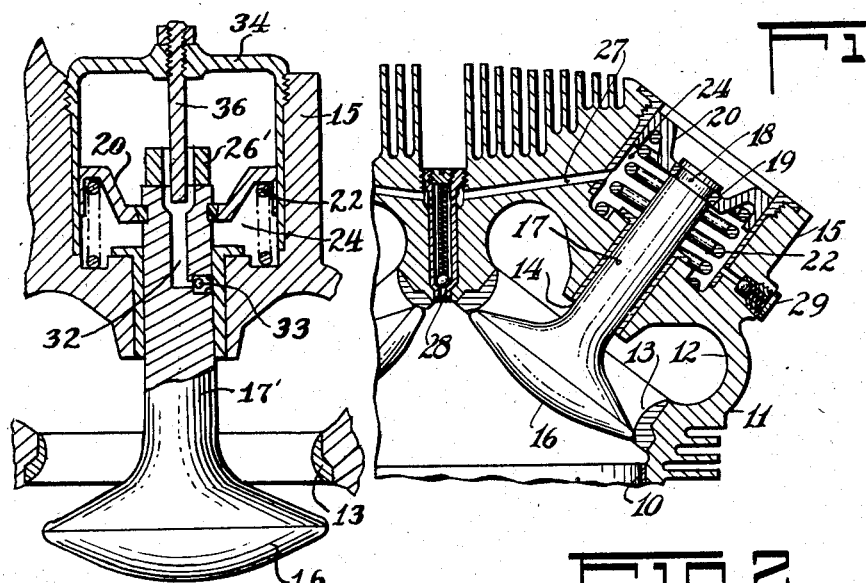
Fig. 2 is a view similar to Fig. 1 showing a second embodiment.

Figs. 5 and 6 are sections on the lines 5—5 and 6—6 respectively of Fig. 4;

Fig. 7 is a fragmentary section showing a fifth embodiment;

Figs. 8 and 9 are sections on the lines 8—8 and 9—9 respectively of Fig. 7;

Fig. 10 is an enlarged sectional view of the modification illustrated in Fig. 3 showing the valve in open position; and Fig. 11 is a detail view of the rocker arm used in the modification of Fig. 3.

The several embodiments shown have certain elements in common which will first be described. An engine cylinder is represented at 10 to the end of which is secured a finned cylinder head 11 provided with a valve port 12, a valve seat 13 and a valve guide 14 concentric with the seat. Above the valve guide 14, a rocker housing 15 is formed in the cylinder head. Slidable in the guide 14 is a poppet valve comprising a tulip-shaped head 16 which may seat at its periphery on the seat 13, and a stem 17 slidable in the valve guide 14 which stem extends into the rocker box, the stem being provided at its upper end with a groove 18 embraced by split locking segments 19 seated in a washer 20.

Figure 1:
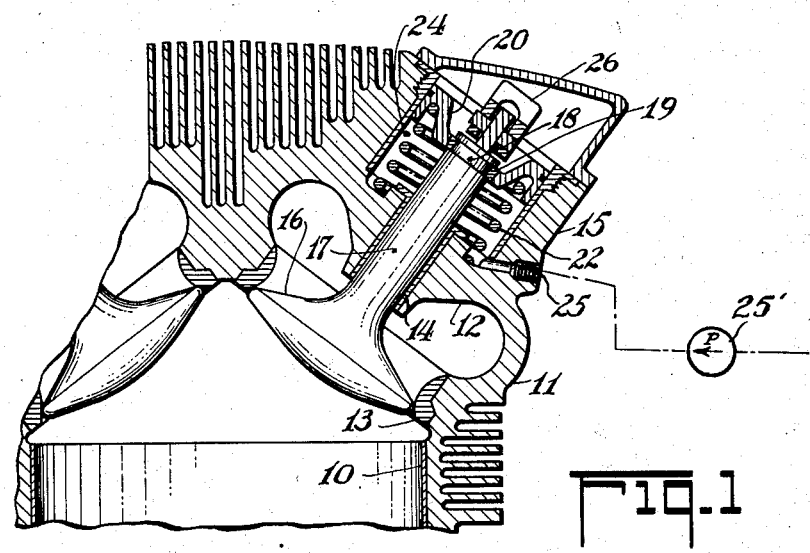
Fig. 1 is a fragmentary section through an air-cooled cylinder head incorporating one embodiment of the invention.

Now referring specifically to Fig. 1, a valve spring 22 is disposed between the washer 20 and the bottom of the valve stem pocket to urge the valve toward a closed position. This pocket 24 is formed as a smooth cylinder while the periphery of the washer 20 is formed as a piston fitted to said cylinder. A pressure connection 25 communicates with the pocket 24 and this pressure connection is fed from a suitable pneumatic pump 25' to maintain in the pocket a value of air pressure appropriate for valve closing at high engine speeds. The spring 22 serves to close the valve at low rotational speeds of the engine and during starting periods when the pneumatic pressure is low. Opening of the valve is afforded by the usual rocker arm part of which is shown at 26. Said rocker arm is of conventional construction and, for example, may be similar to that illustrated in Patent No. 1,993,875 to R. Daub.

The second embodiment shown in Fig. 2 includes the pocket 24 and the piston washer 20 but pneumatic pressure is fed to the pocket through a passage 27 communicating with the combustion space of the engine cylinder through a spring loaded check valve 28. Said valve 28 may comprise a pressure regulating valve of known type to maintain a substantially uniform pneumatic pressure in the valve pocket 24. To prevent excessive pneumatic pressure in the valve pocket, a spring loaded safety valve 29 communicates therewith, this valve discharging into the atmosphere. The spring loading on valve 29 will be sufficient to maintain a maximum pneumatic pressure in the valve pocket appropriate to close the poppet valve under conditions of high engine speed.

In the arrangement of Fig. 3, the pocket 24 as before comprises a cylinder while the washer 20 comprises a piston fitted thereto. However, the valve stem 17' is counterbored as at 32 to comprise a pumping cylinder, the bottom of which is provided with a check valve 33. Secured to the top of the rocker box 15 is a bridge piece 34, overlying the rocker arm 26, which carries a stationary plunger 36 fitted to the bore 32 and with respect to which the valve is reciprocable. The elements 32, 33 and 36 comprise a pneumatic pump which operates as follows:

When the valve is opened by the rocker arm 18, the top end of the valve uncovers the plunger 36 as best seen in Fig. 10, thereby admitting a small quantity of air to the bore 32 through the space between the outer end of the bore 32 and the plunger 36. When the valve closes, this air is ejected through the check valve 33 into the pocket 24. Upon repetitive openings and closings of the valve, pneumatic pressure is built up within the pocket 24 to augment the action of the valve spring 22 to afford valve closing under high speed operating conditions. There will be a certain small leakage of air past the piston washer 19 so that the pressure in the pocket will depend upon the delivery of air from the bore 32 and the leakage of air past the piston 20.

In the modification of Fig. 3, the rocker arm 26' necessarily is slightly different from the rocker arm of Fig. 1 because of the presence of the plunger 36 in Fig. 3. In this modification the rocker arm has a bifurcated valve engaging end portion as seen in Fig. 3 and as indicated at 26'' in Fig. 11.

Lubrication of the piston 20 and associated parts is taken care of by rocker lubricant. Valve guide lubrication may be taken care of by a lubricant pressure conduit thereto.

Referring now to Fig. 4, I show an arrangement wherein the valve stem washer 20' includes three circumferentially spaced plungers 40, 41 and 42 which have axial drillings 43 communicating with one another through horizontal drillings 44 in the washer 20'. These plungers 40, 41 and 42 slide into small cylinders 45 secured within the valve pocket 24'. The plunger 40 with its cylinder comprises a small air pump, air passing to the cylinder 45 through an entrance orifice 46 when the plunger is at the top of its stroke. As the plunger descends, upon valve opening imparted by the push rod or rocker arm, air is compressed within the cylinder 45 and passes a check valve 47 in the plunger 43 to the drillings 44 and to the other plunger-cylinder assemblies 42—45 and 41—45. Thus, the assembly provides an automatic air pump and a pair of air motors, all in a unitary assembly, the two air motors along with the air pump providing a substantially balanced pneumatic organization to produce valve closing force.

Referring now to Figs. 7, 8 and 9, the valve washer 20'' includes two opposite plungers 50 which are slidably fitted to cylinders 51 and 52 secured within the pocket 24''. The bottoms of the cylinders 52 are placed in communication with one another through pipes 54 and one of the cylinders such as 52 communicates either with the cylinder head, as shown in Fig. 2 or with another source of pneumatic pressure as in Fig. 1, through a passage 55. In the arrangement of Figs. 7, 8 and 9, much higher pneumatic pressures are contemplated than in the arrangements of Figs. 1, 2, and 3 and valve closing force is imparted to the valve through the pneumatic pressure within the cylinders 51 and 52 acting upon the two plungers 50 of the valve washer. If desired, small valve springs 56 may be placed within the cylinders 51 and 52 to act upon the valve washer 20'' to afford a small valve closing force upon engine starting and idling.

It is apparent that if fairly high values of pneumatic pressures are used in any one of the systems disclosed, considerable closing force may be imposed upon the valve with a minimum of mechanical parts and with a minimum of occupied space.

In a typical engine valve system, a valve closing force of approximately 350 pounds is necessary for high speed operation. If the valve closing piston area is approximately 3½ square inches, a very moderate pneumatic pressure of 100 pounds per square inch will be adequate to close the valve. This piston area represents a diameter of about 2.3 inches if the area of the valve stem is taken into consideration. To reduce the bulk of the valve closing arrangement, working pressures of the order of 400 to 1,000 pounds per square inch may be used with corresponding reductions in the area and diameter of the pistons used for valve closing.

The pneumatic piston motor idea for obtaining valve closing may also be applied to other parts of the valve operating system and need not be restricted to direct application to the valve stem. However, where the pneumatic motor is applied to push rods or rocker arms, it will of course be necessary to utilize a push-pull form of valve gear such as that shown for instance in Chilton application Serial No. 418,649, filed November 12, 1941.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine valve gear, a valve stem guide, a valve stem reciprocable therein, a plurality of fixed cylinders axially parallel with said stem, a piston reciprocable in each cylinder, means securing said plungers to the valve stem, one of said piston-cylinder assemblies comprising an air pump, and a delivery conduit from said pump to the other piston-cylinder assembly.

2. In an engine valve gear, a valve stem having a cylindrical bore, a guide for the stem, a fixed plunger fitted to the stem bore to comprise an air pump upon valve stem reciprocation, a piston-cylinder assembly axially parallel to the stem, means establishing communication from the air pump to the piston-cylinder assembly, and means securing the piston of said assembly to the valve stem.

3. In an engine valve gear, a valve stem guide, a valve stem reciprocable therein, a cylinder rigid with the guide embracing said stem, a piston secured to the stem and slidably fitted to the cylinder wall, and pump means actuated by valve stem reciprocation to pump air under pressure into said cylinder.

4. In an engine valve gear, a valve stem guide, a valve stem reciprocable therein, a cylinder rigid with the guide embracing said stem, a piston secured to the stem and slidably fitted to the cylinder wall, and pump means actuated by stem reciprocation to pump air under pressure into said cylinder, said pump means comprising a piston-cylinder assembly having one part movable with the valve stem and another part rigid with the cylinder and stem guide.

5. In an engine valve gear, a reciprocable valve, a plurality of piston-cylinder assemblies connected to the stem of said valve, one of said assemblies comprising a pneumatic pump operated by reciprocation of said valve, and means to feed the pneumatic pressure delivered by said pump to the other piston-cylinder assemblies for urging said valve in a closing direction.

6. In an engine valve gear as described in claim 5 in which said piston-cylinder assemblies are axially parallel to the valve stem and symmetrically disposed therearound.

7. In an engine valve gear, a reciprocable valve, a plurality of piston-cylinder assemblies, an operating connection between each said assembly and said valve, means to feed pneumatic pressure to said cylinders to urge said valve in a closing direction, and a conduit interconnecting said cylinders to equalize the pressures therein.

8. In an engine valve gear, a reciprocable valve, means for effecting closing movements of said valve comprising a piston-cylinder assembly operatively connected to said valve, and a fluid pressure pump operated by reciprocation of said valve, said pump having its fluid pressure output connected to said piston-cylinder assembly for urging said valve in a closing direction.

9. In an engine valve gear, a reciprocable valve, means for effecting closing movements of said valve comprising a fluid pressure pump operated by reciprocation of said valve, and means responsive to the output fluid pressure of said pump for urging said valve in a closing direction.

10. In an engine valve gear, a reciprocable valve, means for effecting closing movements of said valve comprising a piston-cylinder assembly operatively connected to said valve and disposed axially parallel thereto, and a fluid pressure pump operated by reciprocation of said valve, said pump having its fluid pressure output connected to said piston-cylinder assembly for urging said valve in a closing direction.

FRED C. MEYER.